United States Patent
David et al.

(10) Patent No.: US 7,516,717 B2
(45) Date of Patent: Apr. 14, 2009

(54) COMBINED LEASH AND JOGGING BELT FOR PETS AND CAREGIVERS

(76) Inventors: Edwin R. David, 9008 Elkridge La., Frederick, MD (US) 21701; Ela David, 9008 Elkridge La., Frederick, MD (US) 21701

( * ) Notice: Subject to any disclaimer, the term of this patent is extended or adjusted under 35 U.S.C. 154(b) by 129 days.

(21) Appl. No.: 11/513,641

(22) Filed: Sep. 1, 2006

(65) Prior Publication Data

US 2008/0072848 A1    Mar. 27, 2008

(51) Int. Cl.
  *A01K 27/00*    (2006.01)
  *A62B 35/00*    (2006.01)
(52) U.S. Cl. .................... 119/770; 119/792; 119/857
(58) Field of Classification Search ............. 119/770, 119/769, 792, 907, 857; 2/312
See application file for complete search history.

(56) References Cited

U.S. PATENT DOCUMENTS

| | | | | |
|---|---|---|---|---|
| 3,099,250 | A * | 7/1963 | Soles, Jr. ............... | 119/776 |
| 3,295,501 | A * | 1/1967 | Riley ..................... | 119/770 |
| 3,395,675 | A * | 8/1968 | Fowlkes ................. | 119/784 |
| 4,667,624 | A * | 5/1987 | Smith .................... | 119/770 |
| D297,673 | S * | 9/1988 | Shapero ............... | D29/101.1 |
| 4,932,362 | A * | 6/1990 | Birchmire et al. ........ | 119/772 |
| 5,038,719 | A | 8/1991 | McDonough | |
| 5,080,045 | A * | 1/1992 | Reese et al. ............. | 119/795 |
| 5,161,486 | A * | 11/1992 | Brown ................... | 119/795 |
| 5,232,424 | A * | 8/1993 | Pearson et al. ........... | 482/106 |
| 5,255,835 | A | 10/1993 | Burks | |
| 5,351,654 | A * | 10/1994 | Fuentes .................. | 119/770 |
| 5,638,772 | A * | 6/1997 | Kaufmann et al. ........ | 119/770 |
| D383,256 | S * | 9/1997 | Hampton ............... | D30/153 |
| 5,664,639 | A * | 9/1997 | Worth .................... | 182/3 |
| 5,718,189 | A * | 2/1998 | Blake .................... | 119/770 |
| 5,842,444 | A * | 12/1998 | Perrulli .................. | 119/770 |
| D407,866 | S | 4/1999 | Perrulli | |
| 5,950,569 | A * | 9/1999 | Perrulli .................. | 119/770 |
| 6,192,835 | B1 * | 2/2001 | Calhoun et al. .......... | 119/792 |
| 6,286,463 | B1 * | 9/2001 | Sykes .................... | 119/858 |
| D454,992 | S * | 3/2002 | Yantz .................... | D30/153 |
| 6,450,129 | B1 * | 9/2002 | Flynn .................... | 119/770 |
| 6,497,198 | B2 * | 12/2002 | Evans .................... | 119/858 |
| 6,513,460 | B2 * | 2/2003 | Fountoulakis ............ | 119/770 |
| 6,732,834 | B2 * | 5/2004 | Colorado ................. | 182/6 |
| 6,851,393 | B2 * | 2/2005 | Bremm .................. | 119/770 |

(Continued)

FOREIGN PATENT DOCUMENTS

EP    322015 A1 *  6/1989

*Primary Examiner*—Yvonne R. Abbott

(57) ABSTRACT

A combined leash and jogging belt includes a belt removably positioned about a waist of the caregiver. The belt has an inner surface formed from non-skid synthetic rubber that includes a plurality of pockets attached to an outer surface thereof, and spaced from the inner surface. The pockets have top and bottom sides registered parallel to top and bottom sides of the belt. The pocket top sides are open and extend along an entire longitudinal length of the pockets. A strap that has opposed ends provided with respective D-rings is coupled thereto, and has a fixed length. A pet harness is positioned about the pet, and has front and rear annular portions concentrically seated about an abdominal cavity thereof. The belt has a mechanism for rotatably tethering the strap to the belt and the pet harness, and includes a double-prong buckle attached to the rotatable tethering mechanism.

18 Claims, 4 Drawing Sheets

U.S. PATENT DOCUMENTS

| | | |
|---|---|---|
| 6,932,027 B1 * | 8/2005 | Whitney .................... 119/770 |
| 2004/0194733 A1 * | 10/2004 | Bremm ...................... 119/770 |
| 2005/0229867 A1 * | 10/2005 | Green ....................... 119/770 |
| 2007/0175407 A1 * | 8/2007 | Everhart .................... 119/792 |

* cited by examiner

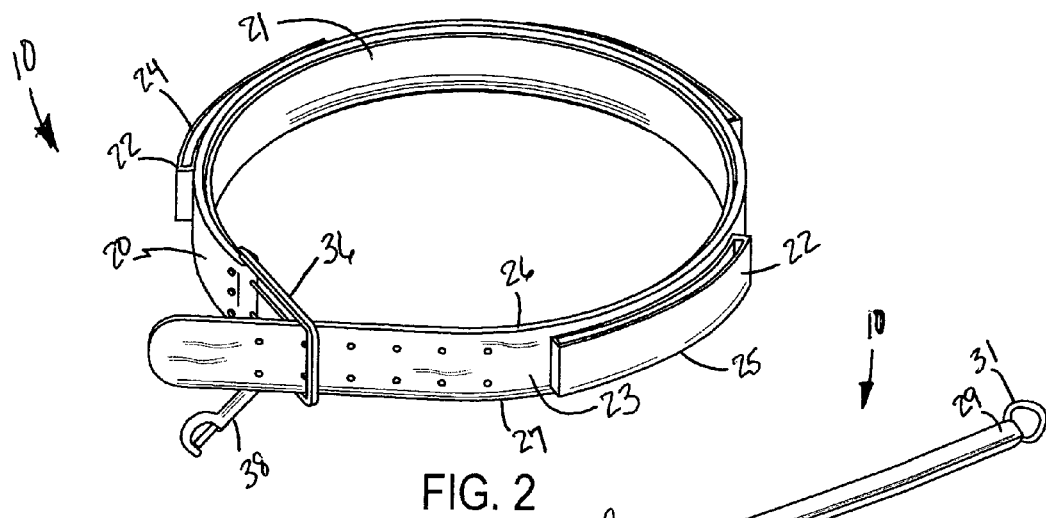
FIG. 2
FIG. 3
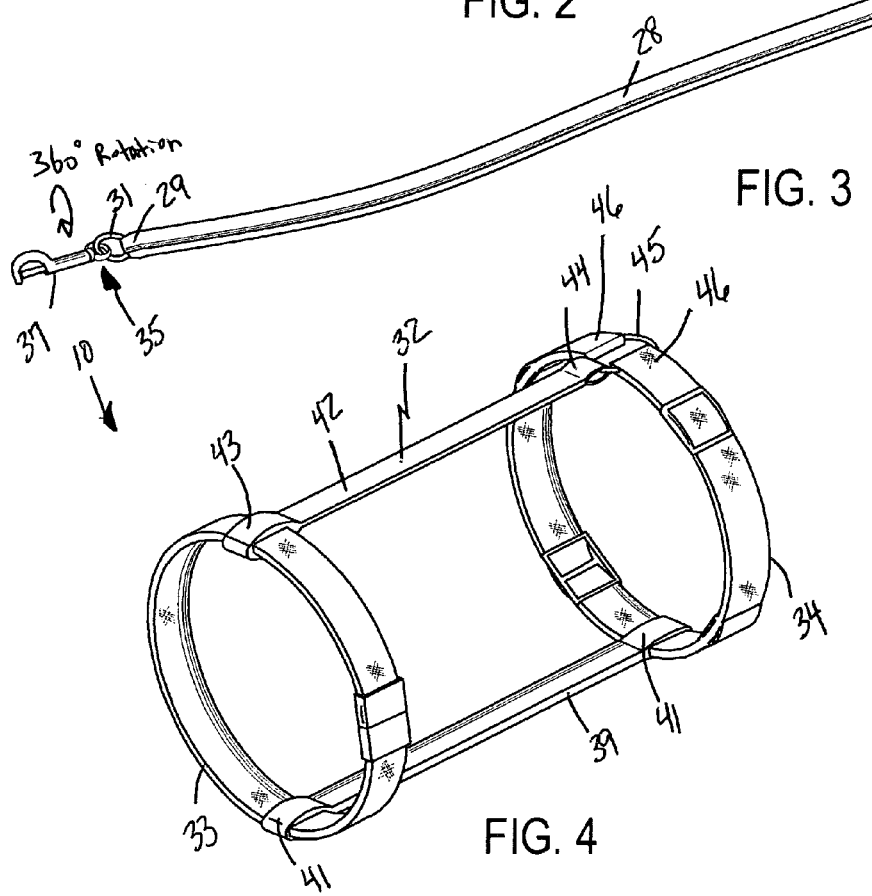
FIG. 4

COMBINED LEASH AND JOGGING BELT FOR PETS AND CAREGIVERS

CROSS REFERENCE TO RELATED APPLICATIONS

Not Applicable.

STATEMENT REGARDING FEDERALLY SPONSORED RESEARCHED OR DEVELOPMENT

Not Applicable.

BACKGROUND OF THE INVENTION

1. Technical Field

This invention relates to jogging belts and, more particularly, to a combined leash and jogging belt for pets and caregivers for allowing a caregiver and a pet to jog in tandem during extended exercise regimens.

2. Prior Art

People walking or jogging with their dog often restrain the dog with a hand-held leash. Such a leash can be inconvenient for both the person and the dog, especially when jogging. Shifting of the dog from side to side forces the person jogging to constantly switch the leash from hand to hand. This can break the rhythm of the person jogging particularly when the dog attempts to cross in front of that person. A hand-held leash can also be stressful on the dog since the natural swinging of a person's arms while jogging can suddenly jerk and pull on the dog's collar. In situations where a person walks a dog while pushing a baby stroller, the person will sometimes tie the hand-held leash to the stroller. Although this frees the person's hands to push the stroller, it can be a safety hazard, especially if the dog becomes agitated and attempts to suddenly run.

One prior art example shows a belt having first and second ends is adapted to encircle the waist of a user. A quick-release fastener is provided between the two ends and is releasable by pulling outwardly on a protruding hand loop at one free end of the belt. A leash can be secured to the belt at a location between its two ends. Unfortunately, this belt can be inadvertently unsecured if the pet's leash, or some other object, comes in contact with the quick release fastener, possibly allowing the pet to be released in an inconvenient or dangerous situation.

Another prior art example shows an apparatus for restraining an animal that includes a belt capable of being worn about the torso of a person. The belt has interior and exterior surfaces. A slide member formed from a length of flexible substantially non-stretchable material has two ends secured to the exterior surface of the belt. A slide member extends along a substantial length of the exterior surface of the belt in adjacent parallel relationship to the belt. A coupling member is slidably mounted along the slide member. Sliding of the coupling member along the slide member allows the lead to slide a substantial distance relative to the belt so that the animal can move a substantial distance about the person. Unfortunately, this prior art example requires multiple pieces that may become lost or damaged, thus rendering the invention useless for its intended purpose. In addition, the slidable apparatus allows less control of the animal during operating conditions, which can be inconvenient or dangerous to both the user and the animal.

Accordingly, a need remains for a combined leash and jogging belt for pets and caregivers in order to overcome the above-noted shortcomings. The present invention satisfies such a need by providing an apparatus that is convenient and easy to use, lightweight yet durable in design, and provides a safe and convenient way for a user and a pet to simultaneously increase cardio-vascular health, thus advantageously improving the prospects of a longer life. Such an apparatus allows the user and the animal to travel at any appropriate speed while allowing the user to maintain effective control over the animal, thus advantageously preventing the animal from encountering any dangerous situations, or coming into unwanted contact with other pedestrians or animals.

BRIEF SUMMARY OF THE INVENTION

In view of the foregoing background, it is therefore an object of the present invention to provide an apparatus for a combined leash and jogging belt for pets and caregivers. These and other objects, features, and advantages of the invention are provided by a combined leash and jogging belt for allowing a caregiver and a pet to jog in tandem during extended exercise regimens.

The combined leash and jogging belt includes a belt removably positioned about a waist of the caregiver. Such a belt has an inner surface conveniently formed from non-skid synthetic rubber. The belt includes a plurality of pockets directly attached to an outer surface thereof, and spaced from the inner surface. Such pockets have top and bottom sides registered parallel to top and bottom sides of the belt for effectively prohibiting undesirable contact with the caregiver during the exercise regimen. The pocket top sides are conveniently open and extend along an entire longitudinal length of the pockets. A flexible and elongated strap has opposed ends advantageously provided with respective D-rings directly coupled thereto. Such a strap has a fixed length.

A pet harness is removably positioned about the pet. Such a pet harness has convenient front and rear annular portions concentrically seated about an abdominal cavity of the pet. A mechanism for rotatably tethering the strap to the belt and the pet harness such that the strap is effectively prevented from rotating about a longitudinal axis thereof when the pet and the caregiver are exercising. The belt includes a double-prong buckle attached to the rotatably tethering mechanism for advantageously resisting premature separation of the belt during intense exercising regimen.

The apparatus preferably includes a rotatably tethering mechanism that includes first and second coextensively shaped quick-connect latches effectively rotatable along a 360 degree path, which is advantageous such that the strap remains at a stationary position while the first and second latches rotate about an axis aligned parallel to the longitudinal axis of the strap. The apparatus includes a first latch that is permanently affixed to the strap and a second latch that is permanently affixed to the belt.

The apparatus may have a pet harness that includes a first linear portion that has conveniently opposed ends directly coupled to the front and rear annular portions. A second linear portion has a distal end directly coupled to the front annular portion and further has a proximal end effectively coupled to the rear annular portion. A ring is conveniently attached to the second linear portion and the rear annular portion such that the first latch can be removably attached directly to the ring during jogging procedures. The apparatus preferably also has a rear annular portion that has separated ends maintained at a fixed spatial relationship by the ring.

The apparatus may also have a first linear portion that is slidably positional along an entire circumference of the front and rear annular portions, which is advantageous so that the pet harness can be adjustably rotated about the pet as desired by the user. The apparatus may still also have a first latch that is permanently affixed to the strap and a second latch that is permanently affixed to the belt.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a perspective view of the belt shown in FIG. 1;

FIG. 3 is a perspective view of the strap shown in FIG. 1;

FIG. 4 is a perspective view of the pet harness shown in FIG. 1;

DETAILED DESCRIPTION OF THE INVENTION

Figure 1:
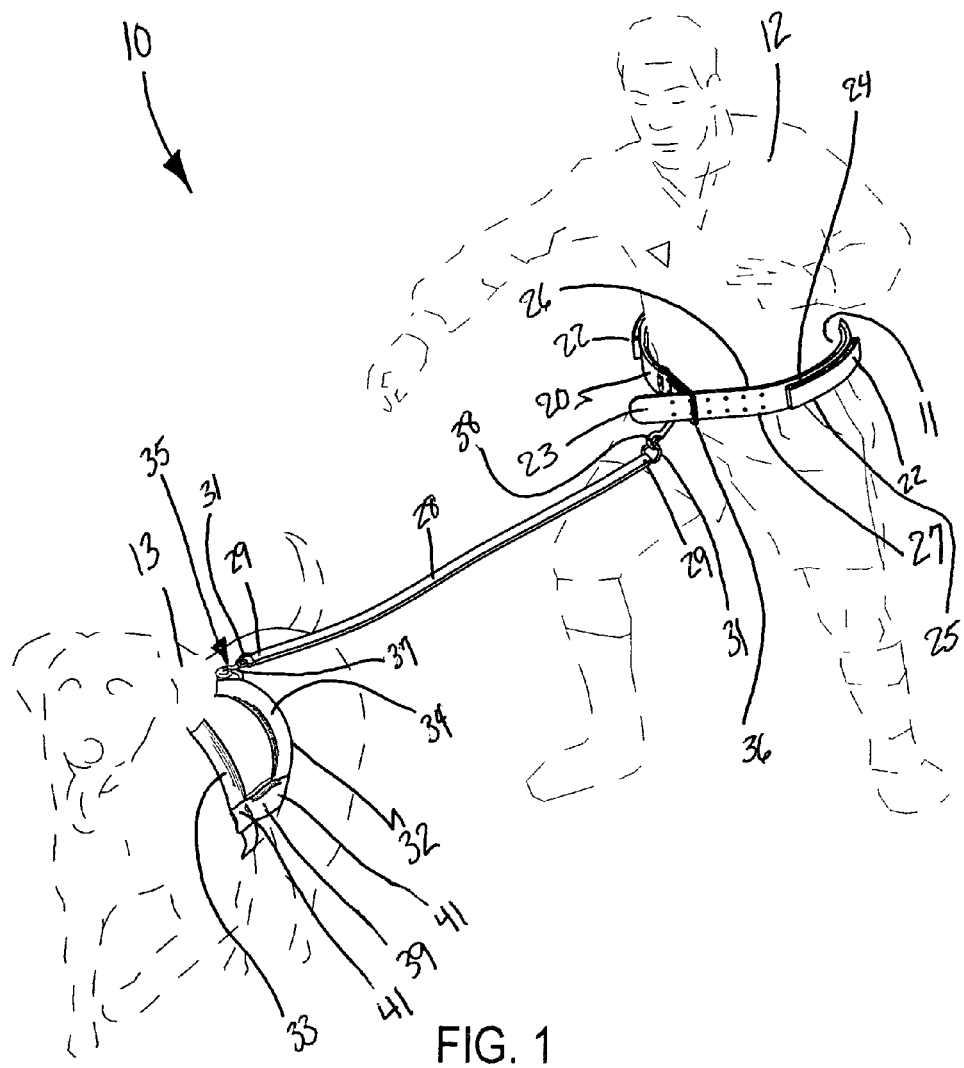
FIG. 1 is a perspective view showing the apparatus being worn by the user and the animal, in accordance with the present invention.
Figure 5:
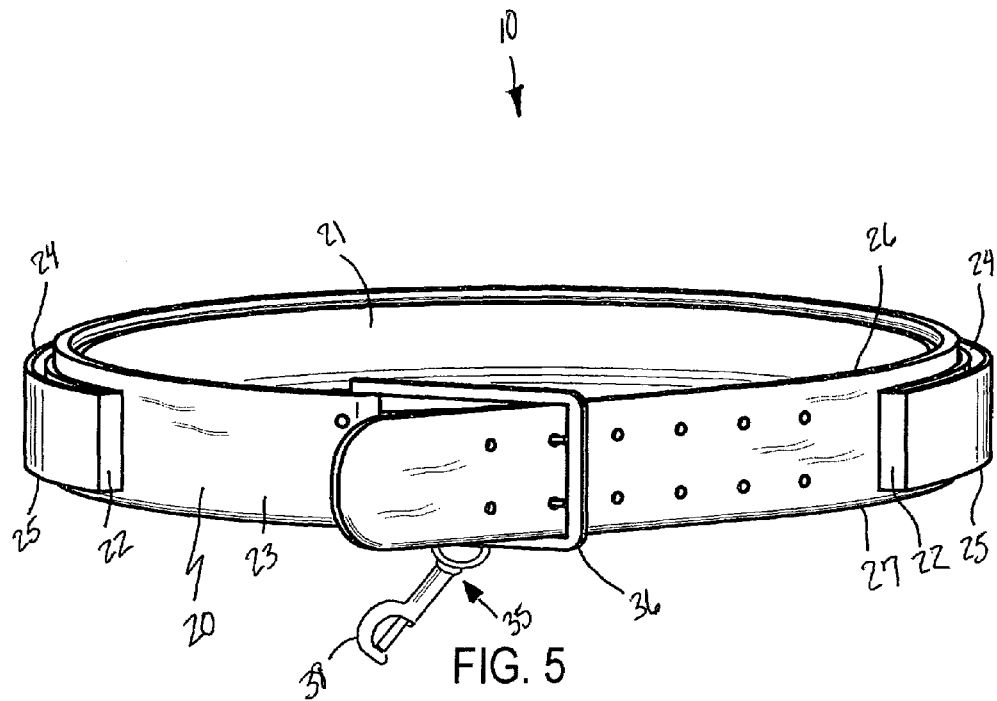
FIG. 5 is a front elevational view of the belt shown in FIG. 2.
Figure 6:
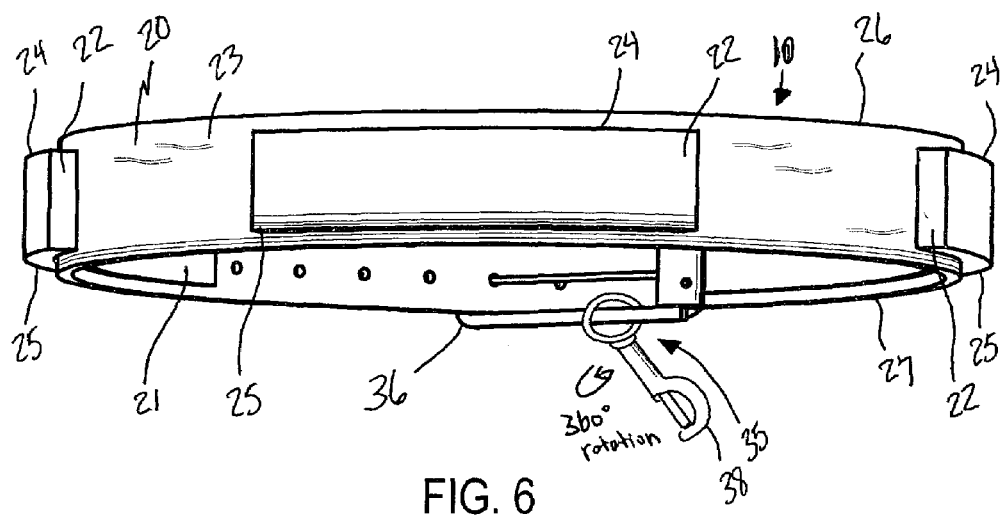
FIG. 6 is a rear elevational view of the pet harness shown in FIG. 2.
Figure 7:
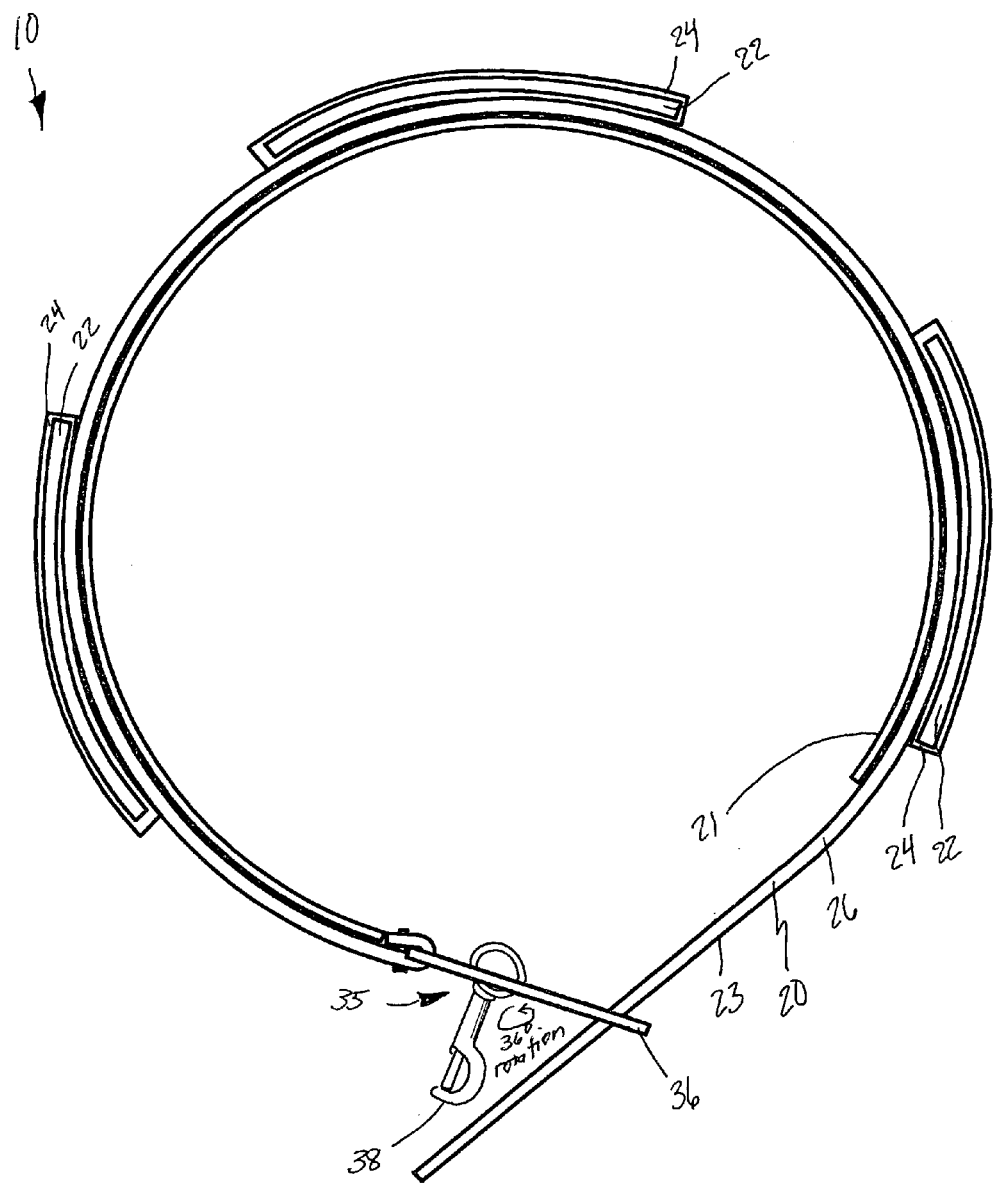
FIG. 7 is a top plan view of the belt shown in FIG. 2.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide a combined leash and jogging belt for pets and caregivers. It should be understood that the apparatus 10 may be used to harness many different types of pets and should not be limited in use to harnessing only cats and dogs and household pets.

Referring initially to FIGS. 1, 2, 3, 4, 5, 6, and 7, the apparatus 10 includes a belt 20 that is removably positioned about a waist 11 of the caregiver 12. Such a belt 20 has an inner surface 21 conveniently formed from non-skid synthetic rubber. Of course, such an inner surface 21 can be produced from a variety of suitable non-skid materials, as is obvious to a person of ordinary skill in the art, such as NEOPRENE, for example.

The belt 20 includes a plurality of pockets 22 directly attached to an outer surface 23 thereof, without the use of intervening elements, and spaced from the inner surface 21. Such pockets 22 have top 24 and bottom 25 sides registered parallel to top 26 and bottom 27 sides of the belt, which is essential and critical for effectively prohibiting undesirable contact with the caregiver 12 during the exercise regimen. The pocket top sides 24 are conveniently open and extend along an entire longitudinal length of the pockets 22. By providing open top sides 24, the caregiver can quickly insert and removed a cell phone, portable radio and other small objects while jogging and without having to directly maintain a line of sight with the belt 20.

A flexible and elongated strap 28 has opposed ends 29 advantageously provided with respective D-rings 31 directly coupled thereto, without the use of intervening elements, which is advantageous for connecting the strap 28 to the harness 32 (described herein below) and the belt 20 respectively. Such a strap 28 has a fixed length. Of course, such a strap 28 can be produced from a variety of suitably flexible materials, and in a variety of lengths, as is obvious to a person of ordinary skill in the art.

Referring to FIGS. 1 and 4, the apparatus 10 includes a pet harness 32 that is removably positioned about the pet 13. Such a pet harness 32 has convenient front 33 and rear 34 annular portions concentrically seated about an abdominal cavity of the pet 13. A mechanism 35 for rotatably tethering the strap 28 to the belt 20 and the pet harness 32 such that the strap 28 is effectively prevented from rotating about a longitudinal axis thereof when the pet 13 and the caregiver 12 are exercising. The belt 20 includes a double-prong buckle 36 directly attached to the rotatably tethering mechanism 35, without the use of intervening elements, which advantageously resists premature separation of the belt 20 during an intense exercise regimen. The double-prong buckle 36 is critical for overcoming prior art shortcomings or prematurely loosing a belt tied about a caregiver's waist.

Referring to FIGS. 1, 2, 3, 5, 6, and 7, the apparatus 10 includes a rotatably tethering mechanism 35 that includes first 37 and second 38 coextensively shaped quick-connect latches effectively rotatable along a 360 degree path, which is advantageous such that the strap 28 remains at a stationary position while the first 37 and second 38 latches rotate about an axis aligned parallel to the longitudinal axis of the strap 28. Such rotatable latches 37, 38 are critical for providing the unexpected result of maintaining the strap 28 at an untangled position while the caregiver 12 and the pet 13 are jogging during extending periods of time. Such rotatable latches 27, 28 advantageously overcome prior art shortcomings of tangling their respective straps during jogging activities. The apparatus 10 includes a first latch 37 that is permanently affixed to the strap 28 and a second latch 38 that is permanently affixed to the belt 20.

Referring to FIGS. 1 and 4, the apparatus 10 includes a pet harness 32 that includes a first linear portion 39 that has conveniently opposed ends 41 directly coupled to the front 33 and rear 34 annular portions, without the use of intervening elements. Of course, such a pet harness 32 can be produced in a variety of sizes, as is obvious to person of ordinary skill in the art. A second linear portion 42 has a distal end 43 directly coupled to the front annular portion 33, without the use of intervening elements, and further has a proximal end 44 effectively coupled to the rear annular portion 34, without the use of intervening elements. A ring 45 is conveniently attached to the second linear portion 42 and the rear annular portion 34, without the use of intervening elements, which is crucial such that the first latch 37 can be removably attached directly, without the use of intervening elements, to the ring 45 during jogging procedures. The rear annular portion 34 has separated ends 46 maintained at a fixed spatial relationship by the ring 45.

Again referring to FIGS. 1 and 4, the apparatus 10 further includes a first linear portion 39 that is slidably positional along an entire circumference of the front 33 and rear 34 annular portions, which is advantageous so that the pet harness 32 can be adjustably rotated about the pet 13 as desired by the caregiver 12.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined leash and jogging belt for allowing a caregiver and a pet to jog in tandem during extended exercise regimens, said combined leash and jogging belt comprising:
    a belt removably positioned about a waist of the caregiver, said belt having an inner surface formed from non-skid synthetic rubber, said belt including a plurality of pockets directly attached to an outer surface thereof and spaced from said inner surface, said pockets having top and bottom sides registered parallel to top and bottom sides of said belt for prohibiting undesirably contact with the caregiver during the exercise regimens;
    a flexible and elongated strap having opposed ends provided with respective D-rings directly coupled thereto, said strap having a fixed length;
    a pet harness removably positioned about the pet, said pet harness having front and rear annular portions concentrically seated about an abdominal cavity of the pet; and
    means for rotatably tethering said strap to said belt and said pet harness such that said strap is prevented from rotating about a longitudinal axis thereof when the pet and the caregiver are exercising.

2. The combined leash and jogging belt of claim 1, wherein said rotatably tethering means comprises:
    first and second coextensively shaped quick-connect latches rotatable along a 360 degree path such that said strap remains at a stationary position while said first and second latches rotate about an axis aligned parallel to the longitudinal axis of said strap.

3. The combined leash and jogging belt of claim 2, wherein said first latch is permanently affixed to said strap and said second latch is permanently affixed to said belt.

4. The combined leash and jogging belt of claim 1, wherein said pet harness comprises:
    a first linear portion having opposed ends directly coupled to said front and rear annular portions;
    a second linear portion having a distal end directly coupled to said front annular portion and further having a proximal end coupled to said rear annular portion; and
    a ring attached to said second linear portion and said rear annular portion such that said first latch can be removably attached directly to said ring during jogging procedures.

5. The combined leash and jogging belt of claim 4, wherein said rear annular portion has separated ends maintained at a fixed spatial relationship by said ring.

6. The combined leash and jogging belt of claim 4, wherein said first linear portion is slidably positional along an entire circumference of said front and rear annular portions so that said pet harness can be adjustably rotated about the pet as desired by the user.

7. A combined leash and jogging belt for allowing a caregiver and a pet to jog in tandem during extended exercise regimens, said combined leash and jogging belt comprising:
    a belt removably positioned about a waist of the caregiver, said belt having an inner surface formed from non-skid synthetic rubber, said belt including a plurality of pockets directly attached to an outer surface thereof and spaced from said inner surface, said pockets having top and bottom sides registered parallel to top and bottom sides of said belt for prohibiting undesirably contact with the caregiver during the exercise regimens; wherein said pocket top sides are open and extend along an entire longitudinal length of said pockets;
    a flexible and elongated strap having opposed ends provided with respective D-rings directly coupled thereto, said strap having a fixed length;
    a pet harness removably positioned about the pet, said pet harness having front and rear annular portions concentrically seated about an abdominal cavity of the pet; and
    means for rotatably tethering said strap to said belt and said pet harness such that said strap is prevented from rotating about a longitudinal axis thereof when the pet and the caregiver are exercising.

8. The combined leash and jogging belt of claim 7, wherein said rotatably tethering means comprises:
    first and second coextensively shaped quick-connect latches rotatable along a 360 degree path such that said strap remains at a stationary position while said first and second latches rotate about an axis aligned parallel to the longitudinal axis of said strap.

9. The combined leash and jogging belt of claim 8, wherein said first latch is permanently affixed to said strap and said second latch is permanently affixed to said belt.

10. The combined leash and jogging belt of claim 7, wherein said pet harness comprises:
    a first linear portion having opposed ends directly coupled to said front and rear annular portions;
    a second linear portion having a distal end directly coupled to said front annular portion and further having a proximal end coupled to said rear annular portion; and
    a ring attached to said second linear portion and said rear annular portion such that said first latch can be removably attached directly to said ring during jogging procedures.

11. The combined leash and jogging belt of claim 10, wherein said rear annular portion has separated ends maintained at a fixed spatial relationship by said ring.

12. The combined leash and jogging belt of claim 10, wherein said first linear portion is slidably positional along an entire circumference of said front and rear annular portions so that said pet harness can be adjustably rotated about the pet as desired by the user.

13. A combined leash and jogging belt for allowing a caregiver and a pet to jog in tandem during extended exercise regimens, said combined leash and jogging belt comprising:

a belt removably positioned about a waist of the caregiver, said belt having an inner surface formed from non-skid synthetic rubber, said belt including a plurality of pockets directly attached to an outer surface thereof and spaced from said inner surface, said pockets having top and bottom sides registered parallel to top and bottom sides of said belt for prohibiting undesirably contact with the caregiver during the exercise regimens; wherein said pocket top sides are open and extend along an entire longitudinal length of said pockets;

a flexible and elongated strap having opposed ends provided with respective D-rings directly coupled thereto, said strap having a fixed length;

a pet harness removably positioned about the pet, said pet harness having front and rear annular portions concentrically seated about an abdominal cavity of the pet; and means for rotatably tethering said strap to said belt and said pet harness such that said strap is prevented from rotating about a longitudinal axis thereof when the pet and the caregiver are exercising; wherein said belt includes a double-prong buckle attached to said rotatably tethering means for resisting premature separation of said belt during intense exercising regimens.

14. The combined leash and jogging belt of claim 13, wherein said rotatably tethering means comprises:

first and second coextensively shaped quick-connect latches rotatable along a 360 degree path such that said strap remains at a stationary position while said first and second latches rotate about an axis aligned parallel to the longitudinal axis of said strap.

15. The combined leash and jogging belt of claim 14, wherein said first latch is permanently affixed to said strap and said second latch is permanently affixed to said belt.

16. The combined leash and jogging belt of claim 13, wherein said pet harness comprises:

a first linear portion having opposed ends directly coupled to said front and rear annular portions;

a second linear portion having a distal end directly coupled to said front annular portion and further having a proximal end coupled to said rear annular portion; and a ring attached to said second linear portion and said rear annular portion such that said first latch can be removably attached directly to said ring during jogging procedures.

17. The combined leash and jogging belt of claim 16, wherein said rear annular portion has separated ends maintained at a fixed spatial relationship by said ring.

18. The combined leash and jogging belt of claim 16, wherein said first linear portion is slidably positional along an entire circumference of said front and rear annular portions so that said pet harness can be adjustably rotated about the pet as desired by the user.

* * * * *